（12）United States Patent
Thörn

(10) Patent No.: US 9,036,070 B2
(45) Date of Patent: May 19, 2015

(54) DISPLAYING OF IMAGES WITH LIGHTING ON THE BASIS OF CAPTURED AUXILIARY IMAGES

(71) Applicant: Sony Mobile Communications AB, Lund (SE)

(72) Inventor: Ola Thörn, Limhamn (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 127 days.

(21) Appl. No.: 13/633,456

(22) Filed: Oct. 2, 2012

(65) Prior Publication Data

US 2013/0107102 A1    May 2, 2013

Related U.S. Application Data

(60) Provisional application No. 61/554,630, filed on Nov. 2, 2011.

(30) Foreign Application Priority Data

Jan. 18, 2012    (EP) .................................... 12000280

(51) Int. Cl.
*H04N 5/222* (2006.01)
*H04N 5/235* (2006.01)
*G06T 15/50* (2011.01)
*H04N 5/262* (2006.01)
*H04N 5/228* (2006.01)

(52) U.S. Cl.
CPC .............. *H04N 5/2354* (2013.01); *G06T 15/50* (2013.01); *H04N 5/2621* (2013.01)

(58) Field of Classification Search
USPC ...................... 348/207.99, 222.1, 239, 333.12
See application file for complete search history.

(56) References Cited

U.S. PATENT DOCUMENTS

| | | | |
|---|---|---|---|
| 6,809,887 B1 * | 10/2004 | Gao et al. ....................... | 359/725 |
| 8,102,465 B2 * | 1/2012 | Nakao et al. ................... | 348/370 |
| 8,810,672 B2 * | 8/2014 | Nishiyama .................. | 348/218.1 |
| 2010/0265385 A1 * | 10/2010 | Knight et al. ................. | 348/340 |
| 2013/0027512 A1 * | 1/2013 | Aronsson et al. ............... | 348/42 |

* cited by examiner

*Primary Examiner* — Ngoc-Yen Vu
(74) *Attorney, Agent, or Firm* — Locke Lord LLP; Jeffrey D. Hsi

(57) ABSTRACT

For displaying a stored photographic image, an auxiliary image is captured, and light direction information is determined from the captured auxiliary image. On the basis of the determined light direction information, a lighted image is generated from the stored photographic image. The lighted image is then displayed.

12 Claims, 3 Drawing Sheets

DISPLAYING OF IMAGES WITH LIGHTING ON THE BASIS OF CAPTURED AUXILIARY IMAGES

CROSS-REFERENCES TO RELATED APPLICATIONS

This application claims under 35 U.S.C. §119 the benefit U.S. Provisional Application No. 61/554,630, filed Nov. 2, 2011, and European Application No. 12 000 280.3, filed Jan. 18, 2012, the entire contents of both applications are incorporated herein by reference in their entirety.

FIELD OF THE INVENTION

The present application relates to methods of displaying stored photographic images and to corresponding devices.

BACKGROUND

With existing electronic devices, such as digital cameras or mobile phones, it is possible to capture and digitally store photographic images. Such photographic images may later be displayed on the same or another device, e.g., on the display of a mobile phone, of a tablet computer, or the like. However, such displayed photographic images are typically quite static.

Accordingly, there is a need for techniques which allow for displaying stored photographic images in a way which allows for an enhanced viewing experience.

SUMMARY

According to an embodiment of the invention, a method of displaying a stored photographic image is provided. According to the method, an auxiliary image is captured, and light direction information is determined from the captured auxiliary image. On the basis of the determined light direction information, a lighted image is generated from the stored photographic image, and the lighted image is displayed. Accordingly, a stored photographic image may be re-lighted on the basis of the captured auxiliary image, thereby providing an enhanced viewing experience.

According to an embodiment, the method may involve capturing a sequence of auxiliary images, e.g., in the form of real-time video data, and determining a sequence of light direction information from the captured auxiliary images. Then a sequence of lighted images may be generated from the stored photographic image on the basis of the determined sequence of light direction information and be displayed. In this way, the same stored photographic image may be frequently re-lighted for display purposes, thereby generating a dynamic viewing experience. According to an embodiment, capturing the auxiliary image or images, determining the light direction information, generating the lighted image or images, and displaying the lighted image or images may be accomplished in real-time, i.e., without noticeable delay between capturing the auxiliary image and displaying the lighted image.

According to an embodiment, the stored photographic image may comprise stored light direction information, e.g., in the form of a normal map. The normal map may provide a direction vector for each pixel of the stored photographic image. In some scenarios, it is also possible that the normal map provides corresponding direction vectors for different groups of pixels of the stored photographic image.

According to an embodiment, generating the lighted image comprises combining the stored light direction information with the light direction information as determined from the captured auxiliary image. In this way, the stored light direction information and the light direction information as determined from the captured auxiliary image may be taken into account, thereby generating a realistic enhanced viewing experience. Alternatively, the stored light direction information could also be simply be replaced with the light direction information as determined from the captured auxiliary image.

According to an embodiment, both the stored light direction information and the light direction information as determined from the captured auxiliary image may be provided in the form of normal maps, thereby allowing for efficiently combining the stored light direction information with the light direction information as determined from the captured auxiliary image.

According to an embodiment, determining of the light direction information from the captured auxiliary image may be accomplished by analyzing an object in the captured auxiliary image, e.g., a face. In this case, determining of the light direction information can be efficiently implemented by image analysis procedures, without necessarily requiring dedicated hardware.

According to an embodiment, also dedicated hardware may be used for determining the light direction information, e.g., by using a light field camera for capturing the auxiliary image and determining the light direction information on the basis of output signals of the light field camera. Further, capturing of the auxiliary image could be accomplished by a fisheye camera, and determining of the light direction information could be accomplished on the basis of output signals of the fisheye camera. Further, capturing of the auxiliary image could be accomplished by a stereoscopic camera or a 3D camera.

According to an embodiment, capturing the auxiliary image and displaying the lighted image may be accomplished by the same device, e.g., by a mobile device comprising both a display and a camera. In this case, displaying of the stored photographic image can be efficiently adapted to local lighting conditions.

According to an embodiment, a device for displaying a stored photographic image is provided. The device may for example be a mobile phone, a portable computer, a tablet computer, or the like. The device comprises a camera for capturing an auxiliary image, and a processor which is configured to determine light direction information from the captured auxiliary image, and, on the basis of the determined light direction information, generate a lighted image from the stored photographic image. The processor is further configured to control displaying of the lighted image on a display. Further, the device may comprise a display for displaying the lighted image. The device may be configured to implement the above-described method.

According to an embodiment, the camera of the device is a video camera and the processor is configured to determine the light direction information and generate the lighted image in realtime from the output signals of the video camera. For example, the video camera may be a front-facing video camera as provided in some devices, e.g., for the purpose of making video calls or participating in multimedia conferences.

According to an embodiment, the camera comprises a light field camera, a fisheye camera, a stereoscopic camera, or a 3D camera. In this case, the hardware structure of the camera may directly support the determination of the light direction information by the processor.

In some embodiments, the processor may be configured to determine the light direction information by analyzing an object in the captured auxiliary image, e.g., a face. In this case, the camera does not need to be provided with dedicated hardware structures for supporting the determination of the light direction information. However, it is to be understood that image analysis by the processor and dedicated hardware structures of the camera may also be combined for increasing efficiency and precision of determining the light direction information.

The foregoing and other features and advantages of embodiments of the invention will become further apparent from the following detailed description and the accompanying drawings.

BRIEF DESCRIPTION OF THE DRAWINGS

Embodiments of the present invention are illustrated by the accompanying drawings, in which.

DETAILED DESCRIPTION

Figure 1:
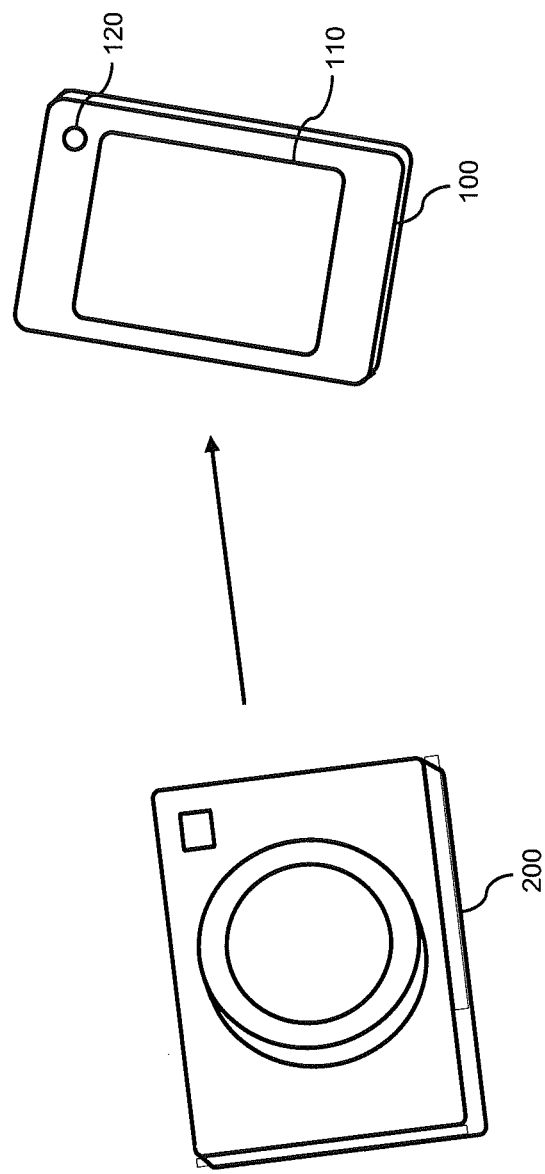
FIG. 1 schematically illustrates devices which may be used for implementing displaying of photographic images according to an embodiment of the invention.

In the following, embodiments of the present invention will be described in more detail and with reference to the accompanying drawings. The illustrated embodiments are merely exemplary and not to be construed as limiting the scope of the present invention. It should be noted that the elements as shown in the drawings are not necessarily to scale with each other, but have been depicted in a manner which allows for conveying features of the illustrated embodiments to a person skilled in the art.

The embodiments of the present invention as described in the following relate to displaying photographic images by an electronic device which comprises an integrated camera and an integrated display, e.g., in the form of a mobile phone, a portable computer, an all-in-one computer, a tablet computer, or the like. However, it is to be understood that the concepts could also be applied in other types of devices, such as devices in which the camera and/or the display are provided as separate elements, e.g., as in a desktop computer system.

FIG. 1 schematically illustrates a device 100 which can be used for displaying photographic images in accordance with an embodiment of the invention. As illustrated, the device 100 includes an integrated display 110 and a camera 120. In the illustrated example, the camera 120 is a front-facing camera, e.g., to be used for the purpose of making video calls or participating in multimedia conferences. The camera 120 could also be a web cam, a TV camera, or some type of auxiliary camera coupled to the device 100. Also, in alternative examples an external display could be used instead of the integrated display 110.

Moreover, FIG. 1 illustrates a further device 200, which can be used for capturing the photographic images to be displayed by the device 100. In FIG. 1, the device 200 is illustrated as a digital camera. However, it is to be understood that the device 200 could also be implemented by other types of devices, such as a mobile phone equipped with a camera device, a video camera, or a computer system equipped with a camera device. As illustrated by the arrow in FIG. 1, a photographic image as captured by the device 200 may be transferred to a device 100, where it can be displayed on the display 110. In other scenarios, the photographic image could also be captured by the device 100 itself and stored for the purpose of later being displayed on the display 110.

In the illustrated embodiment, it is assumed that the device 200 is capable of capturing and storing the photographic image together with light direction information. For example, the device 200 may be implemented as a light field camera, e.g. in the form of a plenoptic camera. Accordingly, the device 200 may store the photographic image in the form of an array of pixels each having one or more associated intensity values, typically three intensity values for representing different color channels like red, green and blue, and additionally also a direction vector representing a direction from which the light was received when capturing the photographic image. The device 200 may store the light direction information in the form of a normal map. The normal map may include a vector representing the direction of light for each pixel of the photographic image. Alternatively, a vector representing the direction of light may be provided for each of a number of pixel groups of the photographic image. Accordingly, the device 200 may store the photographic image together with the light direction information. For this purpose, a suitable digital format may be used. In some scenarios, the photographic image and the light direction information may also be compressed so as to reduce memory usage.

It is now assumed that the captured and stored photographic image was transferred to the device 100, and a user of device 100 wishes to display the photographic image on the display 110 of the device 100. In the illustrated embodiment, the viewing experience of the user is enhanced by dynamically re-lighting the photographic image while being displayed on the display 110 of the device 100. For this purpose, the device 100 may continuously capture auxiliary images using the camera 120 and determine light direction information from these captured auxiliary images. On the basis of the light direction information as determined from the captured auxiliary images, re-lighted images are generated from the stored photographic image. The re-lighted images are then displayed on the display 110. Since the lighting conditions and light directions of the auxiliary image as captured by the device 100 may vary, the displayed re-lighted images will vary accordingly, thereby providing a dynamic viewing experience to the user. Capturing the images by the device 100 and generating the re-lighted images to be displayed may be accomplished in real-time, e.g., using auxiliary images in the form of video data from the camera 120.

Figure 2:
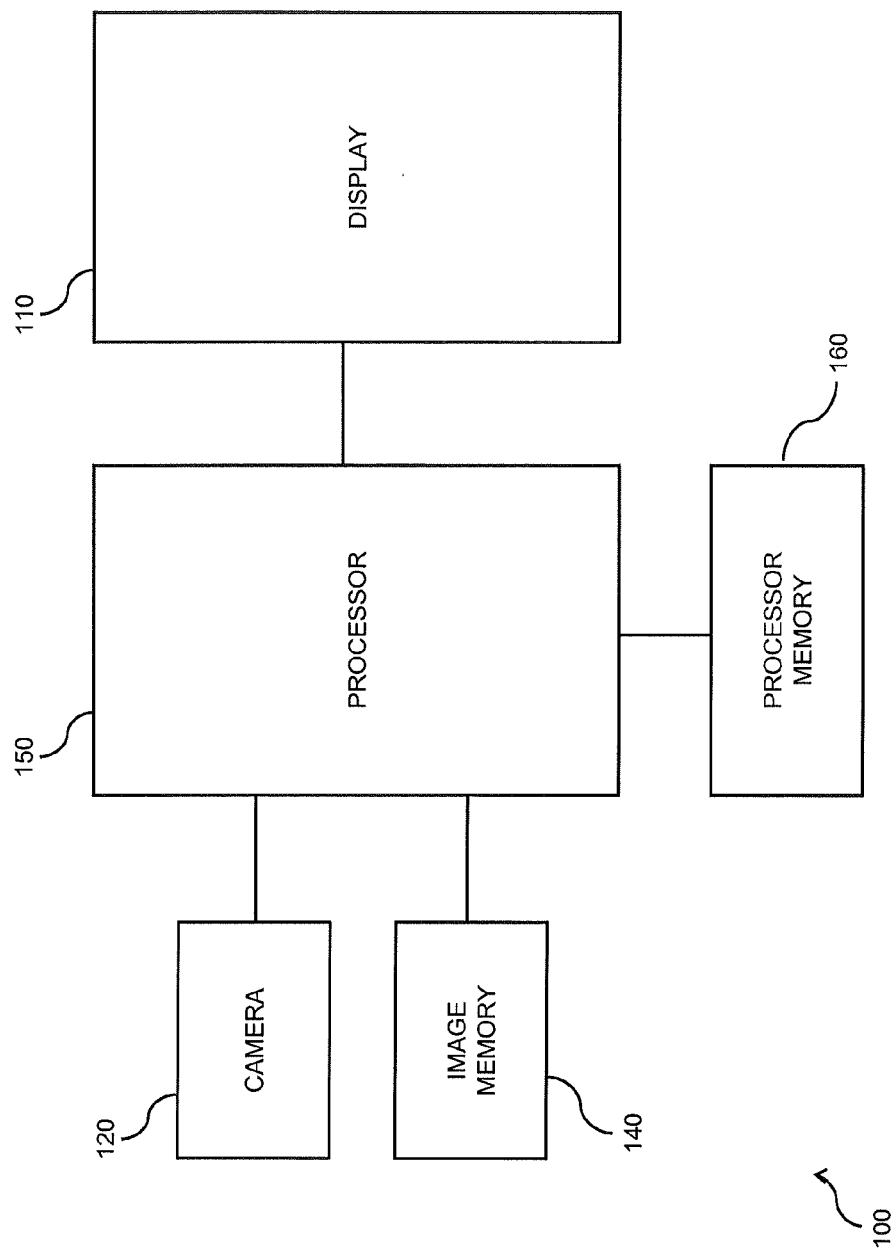
FIG. 2 schematically illustrates structures of a device according to an embodiment of the invention.

FIG. 2 schematically illustrates structures of the device 100 for implementing the above functionalities of displaying the photographic image. Here, it is to be understood that the structures as illustrated in FIG. 2 are merely schematic and that further structures may actually be present, which are not illustrated for the sake of clarity.

As illustrated, the device 100 includes the display 110 and the camera 120. In the illustrated example, the camera 120 is a front-facing camera directed toward the position of a user looking onto the display 110. In other implementations, the camera 120 could be oriented in a different way, e.g., away from the position of a user looking onto the display 110. In some scenarios, the device 100 may include a further camera, e.g., provided as a main camera while the camera 120 is provided as an auxiliary camera, and this further camera could be used in addition or as an alternative for capturing the auxiliary images. The processor is also configured to control displaying of the re-lighted images on the display 110. This may for example involve generating digital or analog signals to drive the display 110. If the display 110 is an external display, these signals may be provided to the external display via a display interface of the device 100. The camera 120 may be provided with hardware structures to support the determination of the light direction information. For example, the camera 120 could be implemented as a light field camera or as a fisheye camera.

Further, the camera 120 could be a stereoscopic camera or a 3D camera. The camera 120 could also include multiple image sensors arranged in a grid. In this case, each image sensor may have a separate lens, and variations of shutter speed between different image sensors may be used to determine directions of light. When using a sufficiently large grid, the positions of the image sensors could be used to extract 3D image data. However, it is to be understood that in some implementations such dedicated hardware structures for supporting determination of light direction information are not needed and camera 120 may be implemented as a typical camera for capturing two-dimensional video images.

As further illustrated, the device 100 comprises an image memory 140 for storing the photographic image. The image memory 140 may for example be a non-volatile memory, such as a flash memory, a harddisk or a solid state disk. The image memory 140 may actually be configured to store a plurality of photographic images.

Further, the device 100 is provided with a processor 150 and a processor memory 160. The processor 150 is configured to accomplish the above-mentioned determination of the light direction information from the auxiliary images as captured by the camera 120 and to apply this determined light direction information when generating the re-lighted photographic images to be displayed on the display 110.

For this purpose, the processor 150 may execute software code as stored in the processor memory 160. Further, the processor 150 may also store operating data in the processor memory 160. The processor memory 160 may include various types of electronic memory, such as random access memory, read only memory, and combinations thereof.

Figure 3:
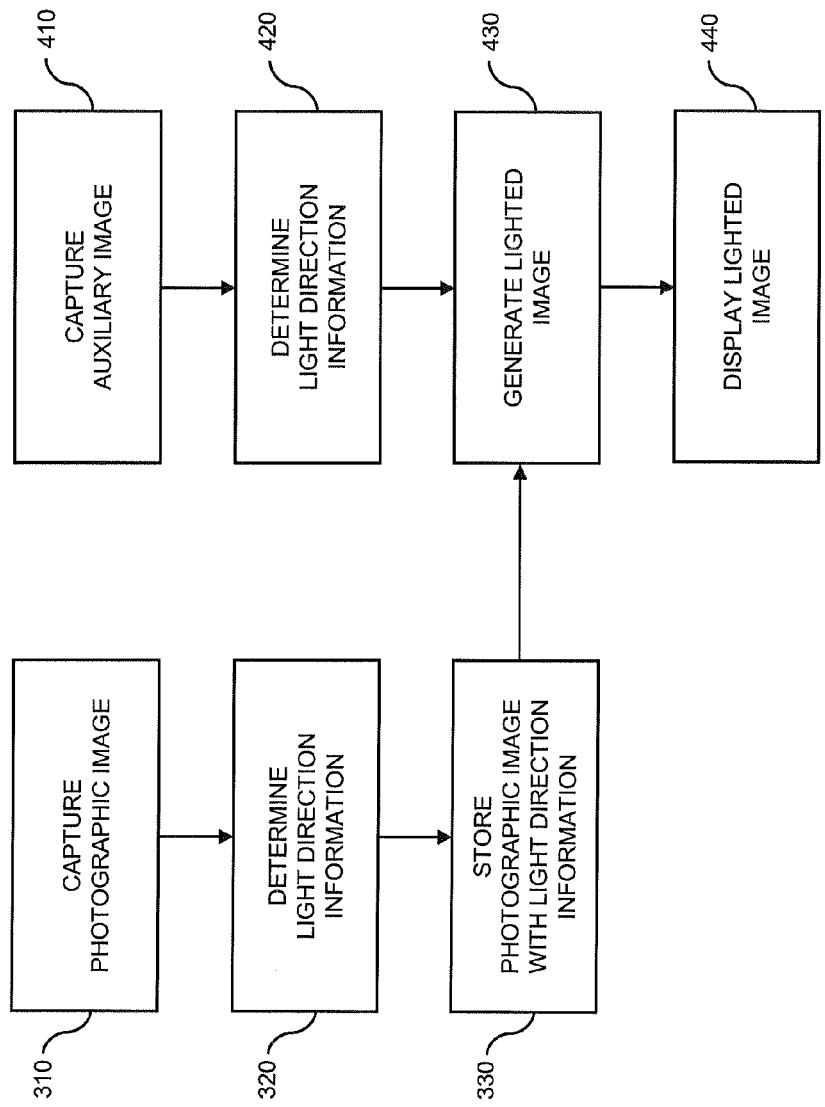
FIG. 3 shows a flowchart for schematically illustrating a method according to an embodiment of the invention.

FIG. 3 shows a flowchart for schematically illustrating a method according to an embodiment of the invention. The method may be implemented by using the devices 100 and 200 as illustrated in FIGS. 1 and 2.

At step 310, a photographic image may be captured. This may be accomplished by a device which is separate from the device which is later used for displaying the photographic image. For example, the photographic image may be captured by means of the device 200 of FIG. 1. Alternatively, the photographic image could be captured by the same device which is later used for displaying the photographic image, e.g., by the device 100 of FIGS. 1 and 2.

At step 320, light direction information of the captured photographic image may be determined. For example, a direction vector may be determined for each pixel of the photographic image, or corresponding direction vectors may be determined for different groups of pixels of the photographic image. The light direction information may for example be determined in the form of a normal map.

At step 330, the photographic image may be stored with the light direction information. The stored photographic image may then later be displayed. For this purpose, the stored photographic image may also be transferred to another device, such as from the device 200 to the device 100 of FIG. 1.

For the purpose of displaying the stored photographic image, at least one auxiliary image is captured at step 410. For example, this may be accomplished by a camera of a device used for displaying the photographic image, e.g. by the camera 120 of the device 100. If the auxiliary image is captured by a front-facing camera such as the camera 120 of the device 100, it may for example show a face of a user to which the photographic image is displayed. In other scenarios, the captured auxiliary image may show other objects.

At step 420, light direction information is determined from the auxiliary image as captured at step 410. In some scenarios, this may be accomplished by subjecting the captured auxiliary image to image analysis. For example, if the captured auxiliary image shows a certain type of object, e.g., a face, positions of shadows in the captured auxiliary image may be used for deducing one or more light directions.

In some scenarios, also dedicated hardware of the camera used to capture the auxiliary image may be provided to support determination of the light direction information. For example, capturing of the auxiliary image at step 410 may be accomplished by means of a light field camera, a fisheye camera, or a stereoscopic camera. In such cases, output signals of the camera could be used in a more direct manner for obtaining the light direction information. In some scenarios, image analysis and dedicated hardware structures of the camera used for capturing the auxiliary image at step 410 may be combined so as to achieve a precise and reliable determination of the light direction information.

At step 430, a lighted image is generated from the stored photographic image. This is accomplished on the basis of the light direction information as determined at step 420. In other words, the photographic image is re-lighted on the basis of the light direction information as determined from the auxiliary image captured at step 410. For this purpose, the light direction information as determined at step 420 may be combined with the light direction information as stored with the photographic image. For example, the light direction information as stored with the photographic image and the light direction information as determined at step 420 could be subjected to averaging. This may also take into account various other aspects, such as reflections on a surface of the display to be used for displaying the lighted image. In the scenario of a front-facing camera 120 as shown in FIG. 1, reflections of ambient light on the surface of the display 110 would for example be visible in the image as captured by the front-facing camera 410, e.g., in the form of brighter areas on the user's face as visible in the captured auxiliary image.

Steps 420 and 430 may be accomplished by a suitably configured processor, such as the processor 150 of FIG. 2.

At step 440, the lighted image is displayed. For example, this may be accomplished on the display 110 of the device 100. For this purpose, digital or analog signals to drive a display may be generated. These signals may be provided to the display via a display interface.

Steps 410 to 440 may be iterated so as to obtain a dynamic re-lighting of the photographic image. In other words, a sequence of auxiliary images may be captured by repeatedly performing step 410, a sequence of light direction information may be determined by repeatedly performing step 420, and a sequence of lighted images may be generated by repeatedly performing step 430. The sequence of lighted images may then be displayed at step 440. This dynamic re-lighting may be accomplished in real-time, i.e., without noticeable delay between capturing the image at step 410 and displaying the lighted image at step 440.

It is to be understood that the embodiments and examples as described above are provided for the purpose of illustrating the general concepts of the present invention and are susceptible to various modifications. For example, the concepts may be applied to displaying various types of photographic image, without limitation to photographic images generated by a light field camera. For example, the photographic images may store three-dimensional image data instead of light direction information. Further, in some cases the concepts could also be applied to two-dimensional photographic images. Further, the stored photographic image could include time-dependent light direction information, i.e., in the form of a sequence of recorded normal maps. The stored photographic image with light direction information could also be generated by a similar process as used in steps 410 and 420 of FIG. 4. Moreover, it is to be understood that parts of the above-described concepts may be either implemented by dedicated hardware or by software to be executed by a multi-purpose processor.

The invention claimed is:

1. A method of displaying a stored photographic image, the method comprising:
   capturing an auxiliary image;
   determining light direction information from the captured auxiliary image;
   on the basis of the determined light direction information, generating a lighted image from the stored photographic image; and
   displaying the lighted image,
   wherein the stored photographic image comprises stored light direction information, and
   wherein said generating the lighted image comprises combining the stored light direction information with the determined light direction information.

2. The method according to claim 1, comprising:
   capturing a sequence of images;
   determining a sequence of light direction information from the captured images; and
   on the basis of the determined sequence of light direction information, generating a sequence of lighted images from the stored photographic image; and
   displaying the sequence of lighted images.

3. The method according to claim 1,
   wherein said capturing the auxiliary image, determining the light direction information, generating the lighted image, and displaying the lighted image is accomplished in real-time.

4. The method according to claim 1,
   wherein the stored light direction information and the determined light direction information are provided in the form of normal maps.

5. The method according to claim 1,
   wherein said determining of the light direction information is accomplished by analyzing an object in the captured auxiliary image.

6. The method according to claim 1,
   wherein said capturing of the auxiliary image is accomplished by a light field camera; and
   wherein said determining of the light direction information is accomplished on the basis of output signals of the light field camera.

7. The method according to claim 1,
   wherein said capturing of the auxiliary image is accomplished by a fisheye camera; and
   wherein said determining of the light direction information is accomplished on the basis of output signals of the fisheye camera.

8. The method according to claim 1,
   wherein said capturing of the auxiliary image and said displaying of the lighted image is accomplished by the same device.

9. A device for displaying a stored photographic image, the device comprising:
   a camera for capturing an auxiliary image; and
   a processor configured to determine light direction information from the captured auxiliary image, configured to generate on the basis of the determined light direction information, a lighted image from the stored photographic image, and configured to control displaying of the lighted image on a display,
   wherein the stored photographic image comprises stored light direction information, and
   wherein the generated lighted image comprises the stored light direction information combined with the determined light direction information.

10. The device according to claim 9,
    wherein the camera is a video camera and the processor is configured to determine the light direction information and to generate the lighted image in real-time from output signals of the video camera.

11. The device according to claim 9,
    wherein the camera comprises a light field camera or a fisheye camera.

12. The device according to claim 9,
    wherein the processor is configured to determine the light direction information by analyzing an object in the captured auxiliary image.

* * * * *